(12) United States Patent
Biran et al.

(10) Patent No.: US 7,483,434 B2
(45) Date of Patent: Jan. 27, 2009

(54) PARALLEL TCP SENDER IMPLEMENTATION

(75) Inventors: Giora Biran, Zichron Yaakov (IL); Leah Shalev, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 805 days.

(21) Appl. No.: 10/724,960

(22) Filed: Dec. 1, 2003

(65) Prior Publication Data

US 2005/0117582 A1    Jun. 2, 2005

(51) Int. Cl.
*H04L 12/28* (2006.01)
*H04L 12/56* (2006.01)
*G06F 15/173* (2006.01)

(52) U.S. Cl. .................................... 370/395.4; 709/238
(58) Field of Classification Search ............ 370/395.52, 370/230–238, 395.4, 395.41, 395.42, 395.43; 709/238–242
See application file for complete search history.

(56) References Cited

U.S. PATENT DOCUMENTS

| | | | | |
|---|---|---|---|---|
| 5,649,157 A | * | 7/1997 | Williams | 711/151 |
| 5,905,871 A | * | 5/1999 | Buskens et al. | 709/245 |
| 6,151,321 A | * | 11/2000 | Benson et al. | 370/395.42 |
| 6,662,203 B1 | * | 12/2003 | Kling et al. | 718/103 |
| 7,298,749 B2 | * | 11/2007 | Biran et al. | 370/395.42 |
| 2002/0152315 A1 | * | 10/2002 | Kagan et al. | 709/228 |
| 2003/0031172 A1 | * | 2/2003 | Grinfeld | 370/389 |
| 2003/0115337 A1 | * | 6/2003 | Jayam et al. | 709/228 |
| 2004/0205773 A1 | * | 10/2004 | Carcido et al. | 719/318 |
| 2005/0005024 A1 | * | 1/2005 | Samuels et al. | 709/238 |
| 2005/0128951 A1 | * | 6/2005 | Chawla et al. | 370/235 |

* cited by examiner

*Primary Examiner*—Seema S. Rao
*Assistant Examiner*—Xavier Wong
(74) *Attorney, Agent, or Firm*—Ira D. Blecker; Hoffman Warnick LLC

(57) ABSTRACT

A system and method for providing parallel implementation of a TCP sender comprising a transmit request handler and a transmitter. A transfer control protocol (TCP) transmission system is provided, comprising: a transmit request handler that receives request events, records the event information into a connection context and either schedules in a ready queue or places in a pending queue a connection establishment; and a transmitter that operates in parallel with the transmit request handler, wherein the transmitter dequeues the connection establishment from the ready queue and prepares packets for transmission based on information recorded in the connection context.

19 Claims, 2 Drawing Sheets

PARALLEL TCP SENDER IMPLEMENTATION

BACKGROUND OF THE INVENTION

1. Technical Field

The present invention relates generally to a TCP (transmission control protocol) transmission system, and more specifically relates to a parallel implementation of a TCP sender comprising a transmit request handler and a transmitter.

2. Related Art

TCP (Transmission Control Protocol) is a connection-oriented transport protocol that sends data as an unstructured stream of bytes. By using sequence numbers and acknowledgment messages, TCP can provide a sending node with delivery information about packets transmitted to a destination node. Where data has been lost in transit from source to destination, TCP can retransmit the data until either a timeout condition is reached or until successful delivery has been achieved. TCP can also recognize duplicate messages and will discard them appropriately. If the sending computer is transmitting too fast for the receiving computer, TCP can employ flow control mechanisms to slow data transfer. TCP can also communicate delivery information to the upper-layer protocols and applications it supports.

TCP protocol was originally designed to be implemented as a single state machine (i.e., processing of events is serialized). However, as network transmission rates increase, straightforward serialization implementations fail to provide the required performance, both for conventional processor-based implementations, and for hardware implementations. A typical sequential TCP transmission implementation builds appropriate packets during handling of different events, including: when an application posts a request for data transmission; when an acknowledgement arrives from a remote TCP; when data arrives from a remote TCP, triggering transmission of a data acknowledgement; and when one of the transmission, persist or delayed ACK timers expire.

In current implementations, the requester (i.e., producer of the event) must wait until event processing, including packet generation, is complete before the requester can continue its work. Unfortunately, this can cause a significant slowdown for the communication network. Accordingly, a need exists for a more efficient TCP transmission system that allows the requester to continue working after an event is produced.

SUMMARY OF THE INVENTION

The present invention addresses the above-mentioned problems as well as others, by providing parallel implementation of a TCP sender (i.e., transmission system) comprising a transmit request handler and a transmitter. In a first aspect, the invention provides a transmission control protocol (TCP) transmission system, comprising: a transmit request handler that receives request events, and either schedules in a ready queue or places in a pending queue a connection establishmant; and a transmitter that operates in parallel with the transmit request handler, wherein the transmitter dequeues the connection establishment from the ready queue and prepares packets for transmission.

In a second aspect, the invention provides a method for transmitting packets in a transfer control protocol (TCP) environment, comprising: submitting a request event to a transmit request handler; processing the request event in the transmit request handler to either schedule in a ready queue or places in a pending queue a connection establishment; providing a transmitter that operates in parallel with the transmit request handler; and utilizing the transmitter to dequeue the connection establishment from the ready queue and prepare packets for transmission.

In a third aspect, the invention provides a system for transmitting packets in a transfer control protocol (TCP) environment, comprising: a connection context for storing event information; a transmit request handler that receives request events, records the event information into the connection context and either schedules in a ready queue or places in a pending queue a connection establishment; a transmitter that operates in parallel with the transmit request handler, wherein the transmitter dequeues the connection establishment from the ready queue and prepares packets for transmission based on event information stored in the connection context; and a queue manager for moving the connection establishment from the pending queue to the ready queue.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
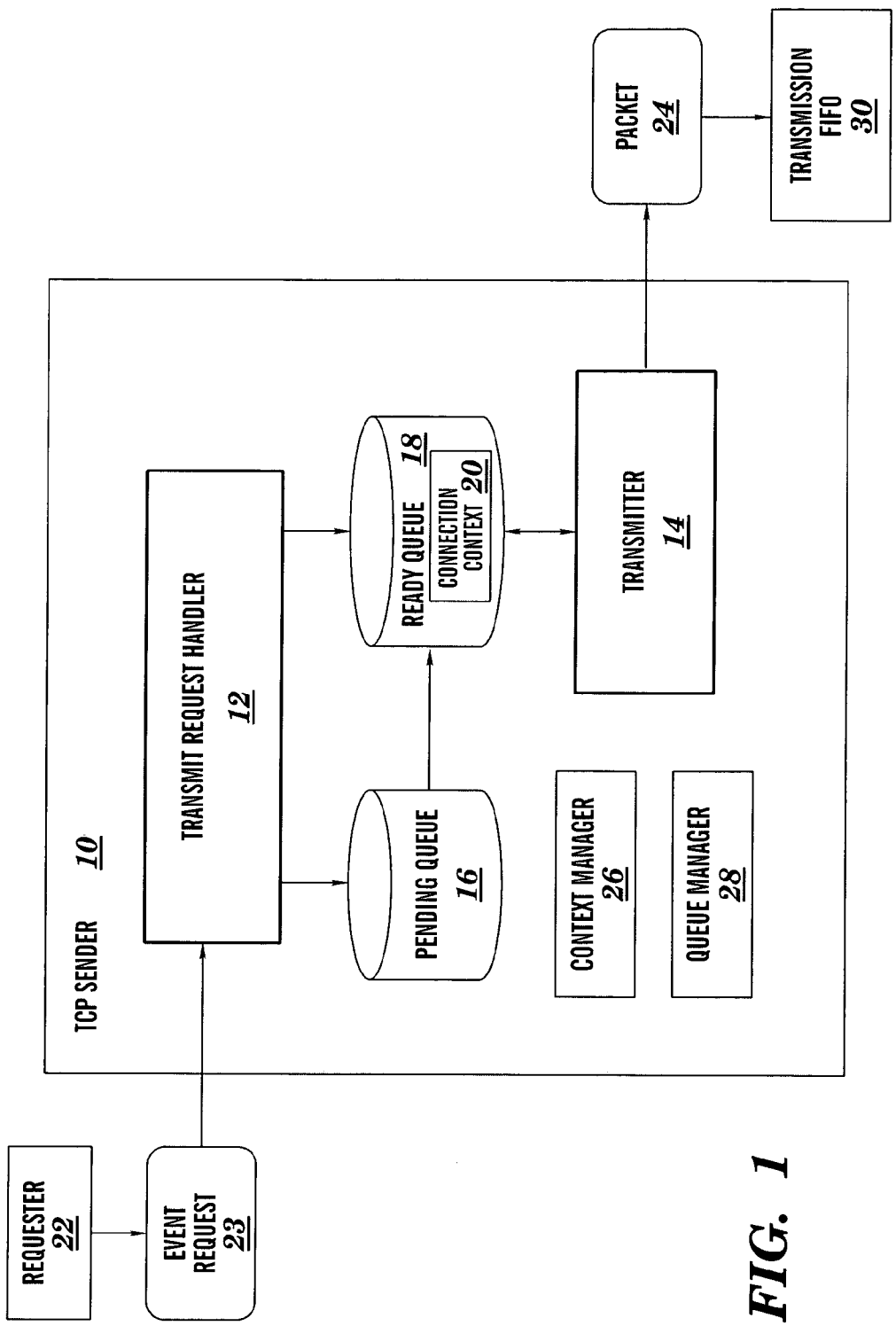
FIG. 1 depicts a TCP sender in accordance with the present invention.

Referring now to the FIG. 1, a parallel implementation of a TCP sender 10 is shown that includes a transmit request handler 12 and a transmitter 14. It is assumed for the purposes of this description that the reader has an understanding of transmission control protocol commensurate with one skilled in art of communication systems. Accordingly, a detailed description of TCP is not provided herein.

Transmit request handler 12 executes event requests 23 from a requester 22 for transmission of data and/or control packets. To allow for efficient parallel processing, transmit request handler 12 performs only minimal handling of requests 23, thereby significantly reducing the wait time for the requester 22. Instead of building packets to be transmitted (possibly at a much later time), transmit request handler 12 just "updates" the state of a corresponding connection. If transmit request handler 12 detects that the conditions for transmitting a packet are not yet satisfied, it can move the connection to a pending arbitration state or pending queue 16. Alternatively, if transmit request handler 12 detects that the conditions for transmitting a packet are satisfied, it schedules the connection to the transmit server by placing the connection in a ready arbitration state or ready queue 18.

Transmitter 14 fetches "ready" connections from the ready queue 18 in parallel to the operation of the transmit request handler 12. Specifically, transmitter 14 retrieves a ready connection, examines its context from connection context 20, builds the appropriate packet 24, and pushes it into the transmission FIFO 30. The only time the transmit request handler 12 and transmitter do not operate in parallel is when they are both handling the same connection.

Context manager 26 manages the connection context 20 for each connection. Connection context 20 is essentially a data structure that stores data pertaining to the particular connection. For instance, it includes bits, flags and/or data indicating: that a request has been made to send an immediate or delayed ACK; that a delayed ACK is to expire; that a transmission shutdown command occurred; how much ULP data is available; timer information; window information; retransmission information; etc.

Queue manager 28 handles requests from the transmit request handler 12 and transmitter 14 involving enqueue/dequeue operations. These processes are described below with reference to FIG. 2.

Figure 2:
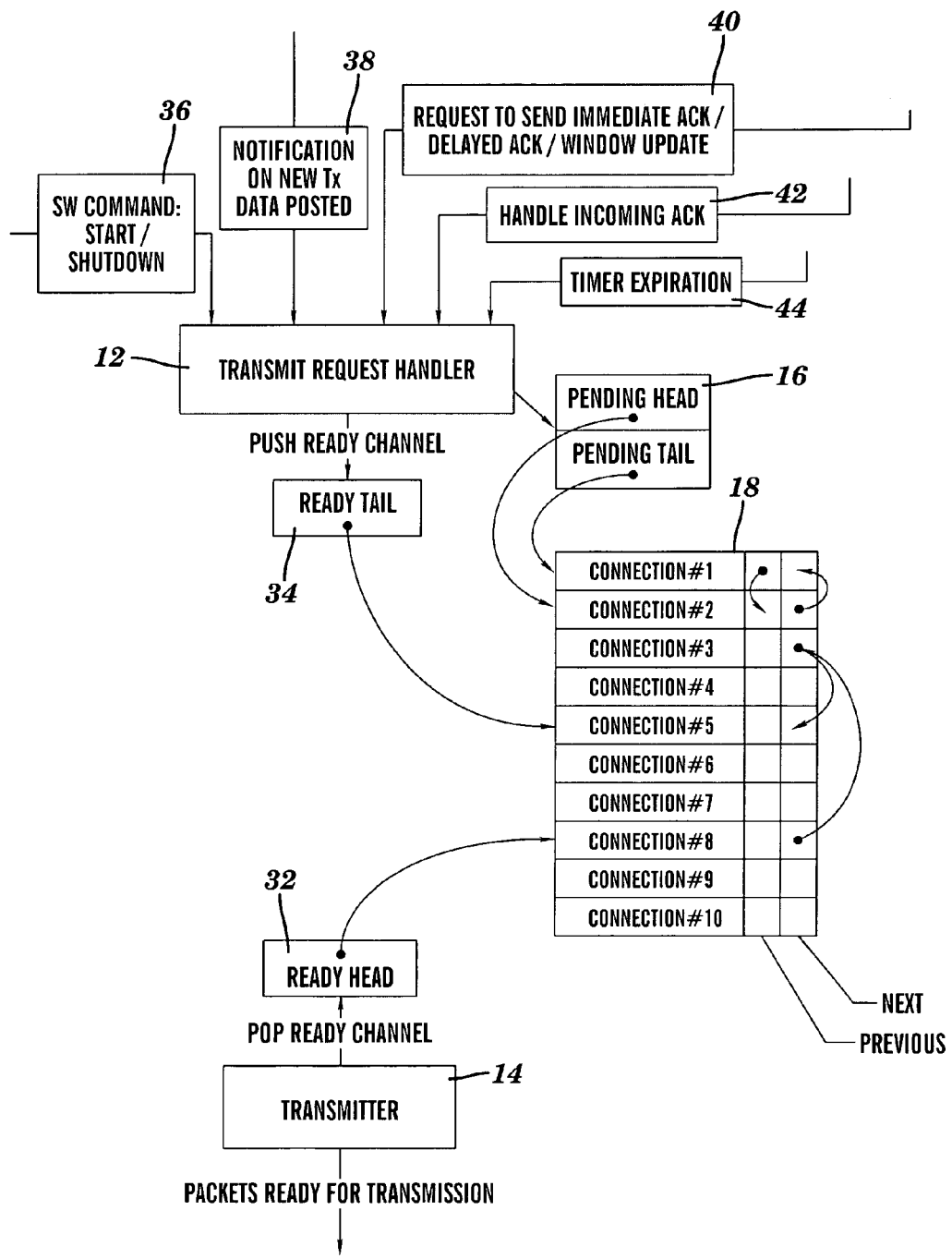
FIG. 2 depicts an exemplary flow of a TCP sender in accordance with the present invention.

Referring now to FIG. 2, an exemplary data flow between the transmit request handler 12 and transmitter 14 is shown. As can be seen, ready queue 18 comprises a queue of connections scheduled for transmission by transmit request handler 12. The connections are maintained in the ready queue 18 as a single linked list (but may be implemented as multiple linked lists, or in any other known manner), using pointers kept in the connection context, and two registers 32 and 34 pointing to the head and tail of the list. Transmit request handler 12 enqueues connections that are ready to be served using the ready list tail 34, and transmitter 14 dequeues connections pointed by the ready list head 32.

As can be seen, transmit request handler 12 is equipped to handle all possible types of event requests, including: software start/shutdown commands 36; a notification of new transmission data posted 38; a request to send an immediate ACK, delayed ACK, or window update 40; or handling an incoming ACK 42. An additional type of event is referred to as timer expiration 44, which is detected by queue manager 28. When this event occurs, the connection is moved to the ready queue 18, and eventually transmitter 14 performs the actual timeout processing. Described below are various examples of how transmit request handler 12 may handle requests 23.

The software start command (from commands 36) is used upon connection creation to trigger transmission of segments related to connection establishment (e.g., ACK), even though no data is available yet. When the transmit request handler 12 receives this command, it moves the connection to the ready queue 18.

When a notification of new transmission data 38 is posted, transmit request handler 12 updates a posted message count in the connection context 20 and performs a segmentation check to decide whether transmit request handler 12 should schedule data transmission. If transmission is allowed, or the connection is in urgent mode, transmit request handler 12 moves the connection to the ready queue 18. Otherwise, the connection is placed in the pending queue 16.

Requests to send an immediate ACK, delayed ACK, or window update 40 are handled as follows. Transmit request handler 12 moves the connection to the ready queue 18 if an immediate ACK was requested, or if too many bytes of data are unacknowledged. Transmit request handler 12 moves the connection to the pending queue 16 if the ACK should be delayed. When a request to send a window update is received, the appropriate connection context 20 is set and the connection is moved to the ready queue 18

For an incoming ACK 40, transmit request handler 12 can perform various functions based on the information in the ACK, including: issuing a notification on completion of data transfer; requesting transmission of a new segment or of a segment according to a fast retransmit algorithm; start/stop the retransmit or persist timers; or issue a notification on arrival of an ACK.

Transmitter 14 provides numerous functions, including: handling timeouts of a retransmit timer; deciding the type of segment to transfer; building transmit commands and requesting segment data; building TCP, IP and MAC headers; recording information on the last transmitted segment (e.g., ACK number, Window, transmission time, etc.); starting the retransmit timer if data was transmitted; and deciding on a next arbitration state.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A transfer control protocol (TCP) transmission system, comprising:
   a transmit request handler that receives request events from a requester including a notification of new transmission data posted, records event information into a connection context and, based on the notification of new transmission data posted, either schedules in a ready queue or places in a pending queue for a connection establishment; and
   a transmitter that operates in parallel with the transmit request handler, wherein the transmitter dequeues the connection establishments from the ready queue and prepares packets for transmission based on information recorded in the connection context.

2. The TCP transmission system of claim 1, wherein the ready queue comprises a linked list of the connection establishments.

3. The TCP transmission system of claim 1, wherein each of the connection establishments comprises a connection context data structure.

4. The TCP transmission system of claim 1, wherein the request events include a request to send an acknowledgement.

5. The TCP transmission system of claim 1, wherein the request events include a request for a window update.

6. The TCP transmission system of claim 1, wherein the request events include handling of an incoming acknowledgement.

7. The TCP transmission system of claim 1, further comprising a queue manager, wherein the queue manager includes means for receiving a timer expiration.

8. The TCP transmission system of claim 1, wherein the transmitter includes:
- means for deciding what type of segment should be transmitted;
- means for building a transmit command and requesting segment data; and
- means for building header information for the segment being transmitted.

9. A method for transmitting packets in a transfer control protocol (TCP) environment, comprising:
- receiving a request event at a transmit request handler, the request event including a notification of new transmission data posted;
- processing the request event in the transmit request handler to, based on the notification of new transmission data posted, either schedule in a ready queue or place the connection in a pending queue a connection establishment;
- providing a transmitter that operates in parallel with the transmit request handler; and
- utilizing the transmitter to dequeue the connection establishment from the ready queue and prepare packets for transmission.

10. The method of claim 9, wherein the request event is further selected from the group consisting of: a request to send an acknowledgement, a request for a window update, and a request to handle an incoming acknowledgement.

11. The method of claim 9, further comprising moving the connection establishment from the pending queue to the ready queue.

12. The method of claim 9, wherein the dequeuing the connection establishment from the ready queue and prepare packets for transmission, includes:
- handling any timeouts of a retransmit timer;
- deciding on a type of segment to transmit;
- building a transmit command and requesting segment data;
- building headers;
- recording information on a previously transmitted segment; and
- starting a retransmit timer if data was transmitted.

13. The method of claim 12, wherein each of the connection establishment includes data describing the request event in a connection context.

14. A system for transmitting packets in a transfer control protocol (TCP) environment, comprising:
- a connection context for storing event information;
- a transmit request handler that receives request events from a requester including a notification of new transmission data posted, records the event information into the connection context, and, based on the notification of new transmission data posted, either schedules in a ready queue or places in a pending queue a connection establishment;
- a transmitter that operates in parallel with the transmit request handler, wherein the transmitter dequeues the connection establishments from the ready queue and prepares packets for transmission based on event information stored in the connection context; and
- a queue manager for moving the connection establishment from the pending queue to the ready queue of the connection establishment of the connection establishments.

15. The system of claim 14, wherein the ready queue comprises a linked list of the connection establishments.

16. The system of claim 14, wherein each connection comprises a of the connection establishments context data structure.

17. The system of claim 14, wherein the request event is selected from the group consisting of: a notification of new transmission data posted, a request to send an acknowledgement, a request for a window update, and a request to handle an incoming acknowledgement.

18. The system of claim 14, wherein the transmitter includes:
- means for deciding what type of segment should be transmitted;
- means for building a transmit command and requesting segment data; and
- means for building header information for the segment being transmitted.

19. The system of claim 14, wherein the queue manager receives any timer expirations.

* * * * *